Figure 1:
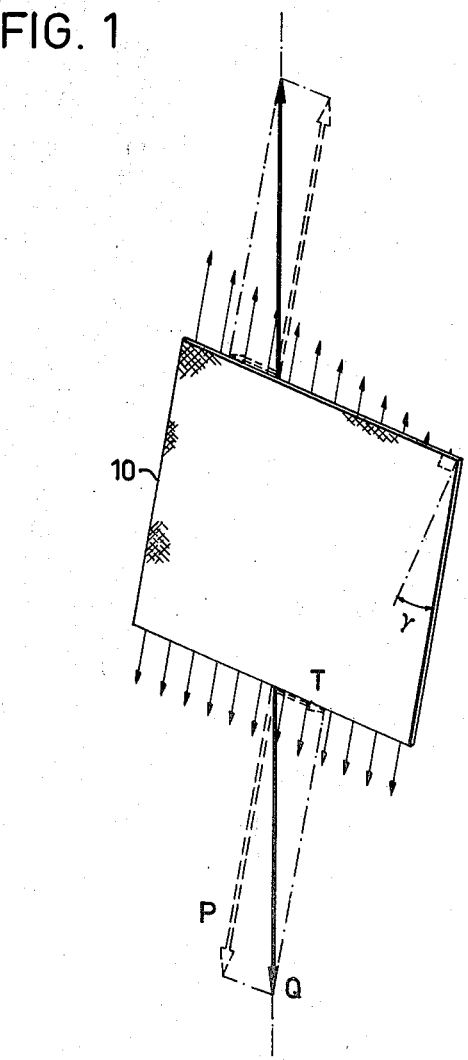

March 23, 1965  B. L. BEHRE  3,174,333
APPARATUS FOR DETERMINING THE RESISTANCE TO SHEAR EFFECT
IN PLANE FABRICS AND SIMILAR MATERIALS
Filed May 6, 1963  3 Sheets-Sheet 1

INVENTOR.
Bengt Lennart Behre
BY
Pierce, Scheffler & Parker
his atty's

March 23, 1965  B. L. BEHRE  3,174,333
APPARATUS FOR DETERMINING THE RESISTANCE TO SHEAR EFFECT
IN PLANE FABRICS AND SIMILAR MATERIALS Filed May 6, 1963  3 Sheets-Sheet 3

INVENTOR.
Bengt Lennart Behre
BY
Pierce, Scheffler & Parker
his attys

3,174,333
APPARATUS FOR DETERMINING THE RESISTANCE TO SHEAR EFFECT IN PLANE FABRICS AND SIMILAR MATERIALS
Bengt Lennart Behre, Goteborg, Sweden, assignor to Stiftelsen Svensk Textilforskning, Stockholm, Sweden, a corporation of Sweden
Filed May 6, 1963, Ser. No. 278,372
3 Claims. (Cl. 73—101)

The present invention relates to an apparatus for determining the resistance to shear effect in plane fabrics and similar materials.

This application is a continuation-in-part of my pending application for Method and Apparatus for Determining the Ability of Fabrics and Similar Materials to Deflect Transversely, Serial No. 2,067, filed January 12, 1960, now abandoned.

In common with my said pending application the object of the present invention is an apparatus to be used, for instance, for comparing the results of various technical processes aiming at an improvement of fabrics and similar materials. For instance, for a chemical treatment resulting in a low resistance to shear effect it has been proved that the suppleness will be more improved than for such a treatment resulting in a high resistance to shear effect. Hitherto, such differences could be noticed only by the sense of feeling when crumpling the material by hand or by visual estimation of the extent to which a fabric can resist shear effect before it crinkles more or less visibly.

The invention resides in an apparatus for testing two or more samples under the same conditions and comparing the result. No absolute value of the property is obtained but arbitrary figures which may serve as basis for a comparison are obtained.

The method for determining the resistance to shear effect of fabrics and similar materials comprises providing rectangular samples of equal sizes of the material, successively clamping two opposite edges of each sample between two straight, parallel clips, suspending each sample pivotally and freely hanging at one of said clamped edges, the lengths of said one clamped edge on either side of the pivot point being different and the distance between the pivot point and the middle of said one clamped edge being equal for all samples to be compared and not more than one sixth of the length of said one clamped edge, which is the condition of remaining plane for the samples, and applying a load evenly along the other clamped edge, said load being sufficient to produce a measurable shearing of the plane sample but insufficient to considerably extend the sample, thereby applying to each sample the same tensile force parallel to the free edges of each sample and the same shear force in the direction of said clamped edges, measuring the deviation of the first named clip to the horizontal for each sample, transferring each sample and suspending it at the same clamped edge and in the same way as previously with the exception of the middle of said clamped edge being positioned on the other side of the pivot point, measuring the deviation of the first named clip to the horizontal for each sample, calculating the angle which each sample has been sheared between its two suspensions, and comparing said shear angle for all samples.

The apparatus for carrying said method into effect comprises a frame having two parallel, horizontally disposed, spaced apart knife edges at the same height, a balancing system having means for pivotally supporting the same on said knife edges, the center of gravity of said system being changeable to coincide with any of two pivot axes thereof, said system comprising means for clamping one of two parallel edges of a sample of fabric with the length of said one edge at least three times the distance between said two pivot axes and the center of said one edge placed half-way between said two pivot axes, means for applying an evenly distributed load along the other of said two parallel edges of said sample of fabric and means for measuring the inclination of said balancing system caused by said load.

Figure 2:
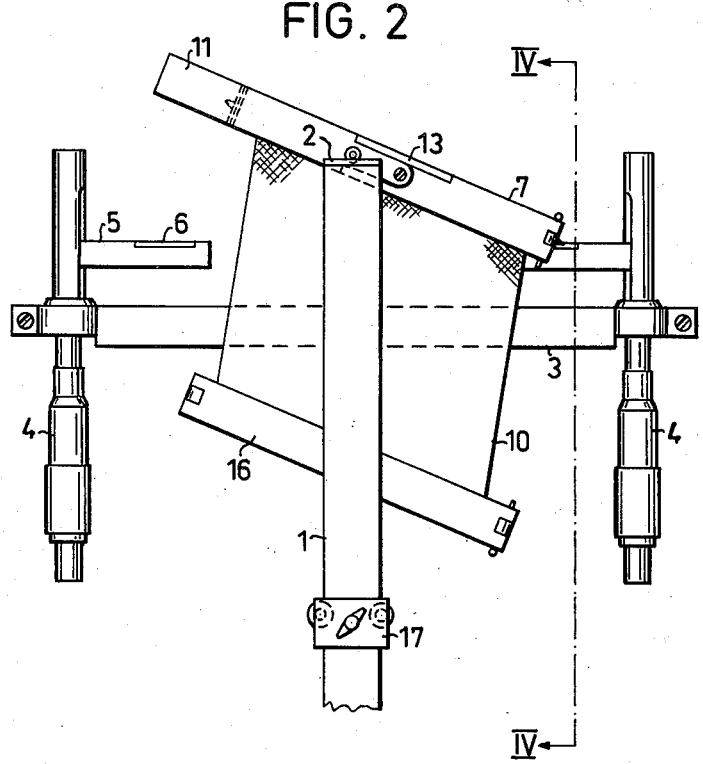
Figure 3:
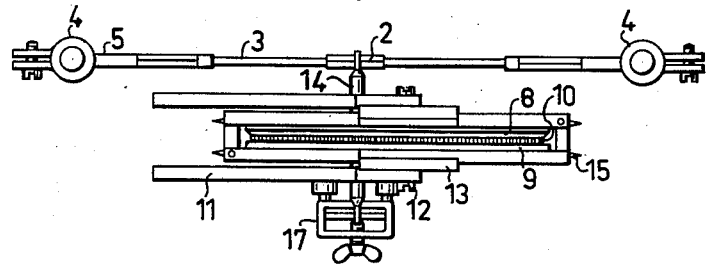
Figure 4:
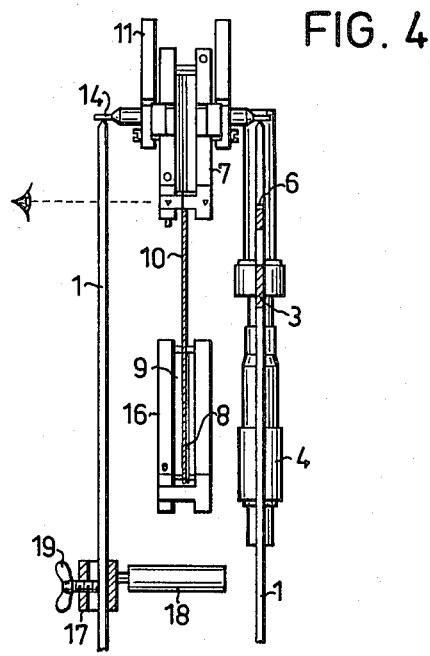
Figure 5:
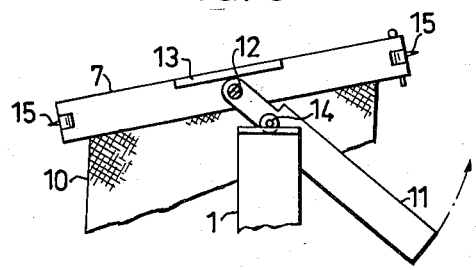

The invention is described more closely hereinbelow with reference to the accompanying drawings. FIG. 1 is a diagrammatic view of the forces which act upon a sample fastened in an apparatus according to the invention, FIG. 2 is a lateral view of the apparatus with a sample during measurement, FIG. 3 is a top view of FIGURE 2, FIG. 4 is a view of the apparatus in the direction of the arrows IV—IV in FIG. 2, and FIG. 5 is a detail view of a balance beam.

FIG. 1 illustrates in principle the forces which act upon an originally rectangular sample 10, clamped along two opposite edges and supported at a point of the upper clamp in the longitudinal direction thereof at a distance of one-sixth of the length of the upper clamped edge from the middle. The load Q equals the gravity force acting on the lower clip. A reaction-force of the same size acts upwards on the supporting point of the upper edge of the sample. It is shown for a wide variety of woven fabrics that each of the two mentioned forces Q can be resolved into a shear force T acting in the direction of the clamped edge and a tensile force P acting parallel to the free edges. On the lower edge the force P is uniformly distributed while on the upper edge it it it triangularly distributed because of the locality of its point of action. These distributions are shown in FIG. 1 where the length of each little arrow is proportional to the tensile stress $\sigma$ at its point of action. The shear force T, on the other hand, is parabolically distributed which is not shown in the figure. These stresses are, in accordance with a well known conventional theory of deformation of elastic and isotropic materials, described by the equations $$t.\sigma_{x=0} = \frac{P}{h}$$

$$t.\sigma_{x=1} = \frac{1}{h}\left(P + \frac{12}{h^2}.l.T.y\right)$$

$$t.\tau_{xy} = \frac{3}{2}.\frac{T}{hb}\left(1 - \frac{4y^2}{h^2}\right)$$

where $t$ = the thickness
$l$ = the clamped length of sample in P-direction
$h$ = the length of sample in T-direction
$\tau_{xy}$ = the shear stress $x$ in P-direction and $y$ in T-direction are coordinates both positive upwards from the center of the lower edge.

As the sample in the invention is wanted plane, $\sigma_x$ should never be negative, and $$\sigma_x = 0 \text{ means } \left(P + \frac{12}{h^2}.l.T.y\right) = 0$$

or $$\frac{T}{P} = \frac{1}{6}$$

when $h = l$ and $y = -0.5\,h$

From this result and from FIG. 1 it is found that the ratio of the distance between the supporting point and the middle of the upper clamp to the length of the edge of the sample must not be more than one-sixth, as the method is intended to be used also for fabrics with low bending stiffness. Otherwise such a fabric would wrinkle. From FIG. 1 is furthermore calculable, if the shear angle is called $\gamma$ and the inclination angle of the upper edge from the horizontal level is called $\alpha$, that the shear force $$T + \frac{Q}{6} \cdot \frac{\cos \alpha}{\cos \gamma}$$

which means that T is approximately independent of $\gamma$ for $$\frac{\cos \alpha}{\cos \gamma}$$

only changes from 0.99 to 0.95 in the limits 0°–20°. The more compliant for shear forces a fabric is, the greater will the shear angle $\gamma$ be under the chosen shear force T and the greater will the inclination angle $\alpha$ be as well as sin $\alpha$. There is a simple relationship between $\gamma$ and sin $\alpha$ given by the geometry of FIG. 1 as $$\sin (90 - \alpha) = 6 \sin (\alpha - \gamma)$$

So the distance of a certain point of the upper clip from the level can be used for measurements, and the shear angle $\gamma$ can be calculated therefrom. The load Q is chosen so small that the extension of the threads can be disregarded, but yet so great that the shear force will be cause a shear angle $\gamma$ which readily can be measured. The load Q is then kept constant for measurements of the various fabrics and therefore the angle $\gamma$ can be used at comparisons between the shear compliance of the fabrics.

The apparatus comprises a frame 1 consisting of two uprights the top ends of which are in the form of knife edges 2 which assume exactly horizontal positions. Secured to the frame is a transverse arm 3 which at each end carries a vertically mounted micrometer 4. The micrometer screws are provided with horizontal reading arms 5 including a sighting wire 6. Placed upon the knife edges 2 is a balance beam in the form of a clip 7 comprising two parallel legs which are articulated to each other. One leg has a longitudinal metallic edge 8 and the other one a plate 9 of a relatively soft material. The sample 10 is inserted between the edge 8 and the plate 9, and the edge of the sample is placed in an accurately predetermined position. On either side of the clip 7 a balance arm 11 is pivotally mounted by means of a bearing 12 at the centre of the clip 7. The clip has abutments 13 which act to stop members to limit the pivotal movement of the balancing arms 11 from a position parallel to the clip 7 to a position swung 180° from the first position. At a certain distance from the pivot, each balance arm 11 has a pin 14, which are intended to rest on the knife edges 2 of the frame. The weights of the clip 7 and the balance arm 11 are such that the centre of gravity of the system lies in the pins 14. At the ends of the clip 7 there are provided sighting pointers 15 for reading against the sighting wire 6 on the reading arm 5. Suspending from the sample 10 is a weight 16 which is formed in a similar manner as the clip 7. The length of the sample is accurately predetermined.

The operation of the apparatus is as follows: After the sample 10 has been fastened between the clip 7 and the weight 16, the balance beam is placed on the knife edges 2 with the balance arms 11 swung to one end position. To prevent stretching of the sample as a result of a sudden application of the weight 16, the frame 1 is provided with a slidable lowering device 17 which comprises a pair of rollers 18. By means of a screw 19 or the like the lowering device is attached to the frame at a high level such that the weight 16 to begin with rests on the rollers 18 without the sample 10 being stretched. Thereupon the rollers are slowly lowered until the sample is freely suspended. Depending upon the distortion of the material of the sample the balance beam will adjust itself at a certain inclination angle to the horizontal. To read off this angle, the sighting wire 6 of the micrometer 4 is adjusted on a level with the sighting pointer 15, and the displacement of the micrometer screw from the initial position with horizontal balance beam is determined. From this displacement the shear angle is obtained by a simple mathematical relation, which may be elucidated by an example.

The length and width of the sample are both supposed to be 100 mm., the distance between the pins 14 and the center of the clip 7 is 15 mm., the distance between the sighting pointer 15 and the center of the clip 7 is 80 mm., the vertical distance between the axis of the pins 14 and the sighting wire 6 is 12 mm. when the micrometer shows zero, and the reading off value on the micrometer is $m$ mm. From these data and the given relationship between $\gamma$ and $\alpha$ and from 80 sin $\alpha = m$ one gets $$\gamma = \sin^{-1} \cdot \frac{12 + m}{80} - \sin^{-1} \cdot 0.15 \cos \left( \sin^{-1} \cdot \frac{12 + m}{80} \right)$$

$$= 0.73 . m . Z$$

Here Z is a correction factor increasing from 0.95 at $m = 0.3$ mm. to 1.05 at $m = 20$ mm. and can be disregarded in routine tests.

Since the shear angle may be of a different size when the shear force T in FIG. 1 is negative, the sum of two shear angles $\gamma$ is used for comparisons, the remaining angle being obtained if the balance arms 11 are swung 180° in which case the balance beam will obviously be inclined in the other direction and the reading has to be taken against the other micrometer.

In a modified embodiment of the apparatus the clip 7 can be provided on either side and at equal distances from the centre with a pin or bearing and a balancing weight displaceable between the ends of the clip, the weights of the clip and the balancing weight being such that their common centre of gravity lies on the axis of the pairs of pins or bearings located nearest the end of the clip at which the balancing weight for the present is placed.

The operation will be substantially the same as described above but instead of swinging the balancing arm 11 the clip with the balancing weight placed at one end thereof is placed with the pins nearest said weight on the knife edge 2 and the inclination is read whereafter the balancing weight is displaced to the other end of the clip which then is placed with the other pair of pins on the knife edge 2.

What I claim is:

1. An apparatus for determining the resistance to shear effect in fabrics and similar materials comprising a frame having two parallel, horizontally disposed, spaced apart knife edges at the same height, a balancing system having means for pivotally supporting the same on said knife edges, the center of gravity of said system being changeable to coincide with any of two pivot axes thereof, said system comprising means for clamping one of two parallel edges of a sample of fabric with the length of said one edge at least three times the distance between said two pivot axes and the center of said one edge placed half-way between said two pivot axes, means for applying an evenly distributed load along the other of said two parallel edges of said sample of fabric and means for determining the inclination of said balancing system caused by said load.

2. An apparatus as claimed in claim 1 in which said means for clamping said one edge of the sample of fabric comprises a clip and said means for pivotally supporting said balancing system on said knife edges comprises a balance arm pivotally connected to each side of said clip at substantially the midpoint thereof and a pivot pin secured to each balance arm at a substantial distance from the midpoint of said clip.

3. An apparatus as claimed in claim 1, in which said means for determining the inclination of said balancing system comprises two sighting points secured to said balancing system and a sighting member having a micrometer adjustment carried by said frame.

References Cited by the Examiner

UNITED STATES PATENTS 2,709,915  6/55  Conti.
3,043,134  7/62  Haynes _____ 73—100

FOREIGN PATENTS 182,762  2/36  Switzerland.

RICHARD C. QUEISSER, *Primary Examiner.*